(12) United States Patent
Isuyama

(10) Patent No.: US 7,997,488 B2
(45) Date of Patent: Aug. 16, 2011

(54) MAGNETIC CARD READER SYSTEM

(75) Inventor: Yasuo Isuyama, Sao Paulo (BR)

(73) Assignee: CIS Electronica Industria e Comercio Ltda., Sao Paulo (BR)

(*) Notice: Subject to any disclaimer, the term of this patent is extended or adjusted under 35 U.S.C. 154(b) by 408 days.

(21) Appl. No.: 12/225,886

(22) PCT Filed: Apr. 6, 2007

(86) PCT No.: PCT/JP2007/057734
§ 371 (c)(1),
(2), (4) Date: Oct. 1, 2008

(87) PCT Pub. No.: WO2007/123005
PCT Pub. Date: Nov. 1, 2007

(65) Prior Publication Data
US 2009/0114724 A1    May 7, 2009

(30) Foreign Application Priority Data
Apr. 19, 2006   (JP) .................. 2006-115297

(51) Int. Cl.
*G06K 7/06* (2006.01)
(52) U.S. Cl. ..................................... 235/449
(58) Field of Classification Search ............ 235/449
See application file for complete search history.

(56) References Cited

U.S. PATENT DOCUMENTS
| | | | |
|---|---|---|---|
| 4,642,716 A * | 2/1987 | Wakabayashi et al. | 360/129 |
| 4,883,949 A * | 11/1989 | Kokubo et al. | 235/449 |
| 6,434,699 B1 * | 8/2002 | Jones et al. | 713/168 |

FOREIGN PATENT DOCUMENTS
| | | |
|---|---|---|
| JP | 2001-143213 | 5/2001 |
| JP | 3496022 | 11/2003 |
| JP | 2005-267031 | 9/2005 |
| JP | 2005267031 A * | 9/2005 |

OTHER PUBLICATIONS

B. Schneier, "Applied Cryptography", Second Edition, 1996, John Wiley & Sons, Inc., pp. 203-206.

* cited by examiner

Primary Examiner — Seung H Lee
Assistant Examiner — Sonji Johnson
(74) Attorney, Agent, or Firm — Clark & Brody

(57) ABSTRACT

There is provided a magnetic card reader system in which a magnetic head and a computer can determine mutual validity and unauthorized duplication of the magnetic card can be prevented. In a magnetic card reader system 10, a computer 13 and a microprocessor perform authentication of each other and determine that a mutual authentication result obtained based on mutual authentication is valid, then the microprocessor encrypts a digital signal and transmits the encrypted digital signal to the computer 13, and the computer 13 decodes the encrypted digital signal.

9 Claims, 13 Drawing Sheets

MAGNETIC CARD READER SYSTEM

TECHNICAL FIELD

The present invention relates to a magnetic card reader system that reads data stored in a magnetic card.

BACKGROUND ART

There is a magnetic card reader system formed of a magnetic head and a computer connected with the magnetic head (see Patent Document 1). The magnetic head is formed of a head main body that reads data stored in a magnetic card and a control unit that converts an analog signal read by the head main body into a digital signal and encrypts the digital signal by using a one-way function. The head main body and the control unit are accommodated in a head container. The control unit of the magnetic head uses a key stored in an RAM thereof to encrypt a digital signal, and transmits the encrypted digital signal to the computer. A control unit of the computer uses a key stored therein to decrypt the encrypted digital signal.

In this system, when the control unit of the magnetic head transmits the encrypted digital signal to the control unit of the computer, the control unit of the computer instructs the control unit of the magnetic head to change the key. A key changing procedure in this system is as follows. When the control unit of the computer decrypts the digital signal received from the magnetic head, it newly generates a key and transmits the generated key to the control unit of the magnetic head. The control unit of the magnetic head replaces the existing key stored in the RAM with the newly transmitted key. Further, when an operator inputs a function changing instruction and a new function from a keyboard, the control unit of the computer transmits the function changing instruction and the new key to the control unit of the magnetic head. The control unit of the magnetic head replaces an existing function with the newly transmitted function.

Patent Document 1: Japanese Patent Application Laid-open No. 2001-143213

DISCLOSURE OF INVENTION

Problem to be Solved by the Invention

In the magnetic card reader system disclosed in the above publication, since the magnetic head and the computer do not perform authentication of each other, they cannot judge mutual validity, and a fraudulent act cannot be detected even if a false computer is connected with the magnetic head or a false magnetic head is connected with the computer. Therefore, in this system, a third party can utilize a false computer or a false magnetic head to fraudulently access the system, and steal card data, e.g., a card number, a code number, a user ID, or a password of the magnetic card. Furthermore, since the control unit of the computer transmits a newly created key to the control unit of the magnetic head, the third party may possibly fraudulently acquire the key in a key transmission process, and the third party can decrypt digital data stolen by using the key to obtain plain text card data of the magnetic card. Therefore, in this system, even if card data stored in the magnetic card is encrypted, completely avoiding theft of plain text card data is difficult, and the third party who has accessed the system may fraudulently duplicate the magnetic card in some cases. Moreover, the third party who has stolen a user ID or a password uses it to perform illegal transaction based on so-called "impersonation" in some cases.

It is an object of the present invention to provide a magnetic card reader system in which a magnetic head and a computer can judge mutual validity and fraudulent connection of a false magnetic head or a false computer can be prevented. It is another object of the present invention to provide a magnetic card reader system that can avoid theft of card data or a key by a third party and prevent fraudulent duplication of a magnetic card or impersonation.

Means for Solving Problem

A premise of the present invention that solves the problem is a magnetic card reader system comprising: a magnetic card reader including a magnetic head that reads predetermined data from a magnetic card storing the data; and a computer connected with the magnetic card reader.

The present invention in the premise is characterized in that: the magnetic head comprises a core including a coil that converts data stored in the magnetic card into an analog signal, an A/D conversion chip that is connected with the coil and converts the analog signal into a digital signal, and a digital IC that is connected with the A/D conversion chip; and the computer and the digital IC have mutual authenticating means for authenticating each other, and the digital IC executes encrypting means for encrypting the digital signal by using a key stored therein and transmitting means for transmitting the digital signal encrypted by the encrypting means to the computer and the computer executes decrypting means for decrypting the encrypted digital signal by using a key stored therein after the computer and the digital IC determine that a mutual authentication result obtained by the mutual authenticating means is valid.

As an example of the present invention, the computer and the digital IC execute key generating means for sequentially generating the same new second to nth keys required for encryption and decryption of a digital signal in synchronization with each other and use the generated second to nth keys to encrypt the digital signal and decrypt the encrypted digital signal every time the digital signal encrypted by the encrypting means is input to the computer.

As another example of the present invention, a hashed output value obtained by hashing a predetermined initial value by using a predetermined one-way hash function is used as the second key generated by the key generating means, and a hashed output value obtained by using the one-way hash function to hash a hashed output value as a previous key hashed by the one-way function is used as each of the third to nth keys generated by the key generating means.

As still another example of the present invention, the computer and the digital IC sequentially generate the second to nth keys while being synchronized with each other by using the same finite regressive counter value stored therein, and the hashed output values serving as the second to nth keys include a hashed output value obtained by hashing the regressive output value.

As yet another example of the present invention, when the computer determines that decryption using the key generated by the key generating means is impossible, the computer again executes the mutual authenticating means with the digital IC, and the computer and the digital IC reset the regressive counter value to an initial value to be again synchronized with each other after determining that a mutual authentication result obtained by the mutual authenticating means is valid.

As a further example of the present invention, the magnetic head includes a housing that covers an outer periphery thereof, and the core, the A/D conversion chip, and the digital IC are accommodated in the housing.

As a still further example of the present invention, the A/D conversion chip and the digital IC are fixed in the housing by a solid substance filling the inside of the housing.

Effect of the Invention

According to the magnetic card reader system of the present invention, since the computer and the digital IC can judge mutual validity by executing the mutual authenticating means, even if a false computer is connected with the magnetic head or a false magnetic head is connected with the computer, it is possible to find out this connection. In the system, a third party cannot access the system by utilizing a false computer or a false magnetic head, thereby avoiding theft of card data such as a card number or a code number of the magnetic card or the key. According to this system, since the digital IC executes the encrypting means and the transmitting means and the computer executes the decrypting means after the computer and the digital IC determine that an authentication result obtained by the authenticating means is valid, theft of card data stored in the magnetic card can be assuredly avoided as compared with a case that these means are executed without performing authentication, thus preventing fraudulent duplication of the magnetic card by the third party. It is to be noted that, in Internet banking, a so-called "impersonation" act that a third party who has stolen card data creates a false site in a site of a bank or a credit card company to carry out an illicit transaction with the band or the credit card company in some cases. However, since the third party cannot steal card data of the magnetic card in this system, a false site cannot be created, thus preventing "impersonation" by the third party.

In the magnetic card reader system in which the computer and the digital IC are synchronized with each other to sequentially generate the same new second to nth keys required for encryption and decryption of digital signals, since the computer and the digital IC individually generate the second to nth keys, the computer does not have to transmit the key to the digital IC, thereby avoiding fraudulent acquisition of the key in the key transmission process. In this system, since the digital IC always uses another key to perform encryption and the computer always uses another key to effect decryption, even if a third party obtains the key, card data stored in the magnetic card cannot be decrypted, thus effectively avoiding fraudulent duplication of the magnetic card by the third party or "impersonation" by the third party.

In the magnetic card reader system in which the generated second key has a hashed output value obtained by hashing an initial value by a one-way hash function and each of the generated third to nth keys has a hashed output value obtained by using the one-way hash function to further hash a hashed output value as a previous key hashed by the one-way function, since the hashed value is used for the key, even if the key is fraudulently obtained by a third party, the key cannot be decoded, thus assuredly avoiding use of the key by the third party. In this system, even if card data of the magnetic card or the key is acquired by the third party, the card data cannot be decrypted, thereby effectively avoiding fraudulent duplication of the magnetic card by the third party or "impersonation" by the third party.

In the magnetic card reader system in which the computer and the digital IC use the same finite regressive counter value to be synchronized with each other and sequentially generate the second to nth keys, the key generated by the computer can be matched with the key generated by the digital IC, thereby avoiding disabled decryption of digital signals due to mismatch between the generated keys. In the system, since hashed output values as the second to nth keys include a hashed output value obtained by hashing a regressive counter value, even if the third party fraudulently accesses the system, he/she cannot decode the hashed regressive counter value and cannot judge which counter value is used by the computer and the digital IC to be synchronized with each other. In this system, the key generated by the computer cannot be matched with the key generated by the digital IC even if the third party fraudulently accesses the system, stolen card data cannot be decrypted, thereby effectively avoiding fraudulent duplication of the magnetic card by the third party or "impersonation" by the third party.

In the magnetic card reader system in which the computer determines that decryption using the key is impossible, then again executes the mutual authenticating means with the digital IC, and the computer and the digital IC determine that an authentication result is valid and then reset a regressive counter value to an initial value to be again synchronized with each other, even if the generated keys do not match with each other, since the computer and the digital IC reset the regressive counter value to the initial value to be again synchronized with each other, the key generated by the computer can be again matched with the key generated by the digital IC, thus avoiding disabled decryption of card data due to mismatch between the generated keys.

In the magnetic card reader system in which the core, the A/D conversion chip, and the digital IC are accommodated in the housing covering the outer periphery of the magnetic head, since card data converted into analog signals or digital signals cannot be stolen unless the magnetic head itself is disassembled, theft of the card data stored in the magnetic card can be assuredly avoided, thereby effectively preventing fraudulent duplication of the magnetic card by the third party or "impersonation" by the third party.

In the magnetic card reader system in which the A/D conversion chip and the digital IC are fixed in the housing by using a synthetic resin, since the synthetic resin must be removed when disassembling the magnetic head and the A/D conversion chip and the digital IC are destroyed when removing the synthetic resin, a data theft device can be prevented from being disposed to the A/D conversion chip and the digital IC, thereby effectively avoiding fraudulent duplication of the magnetic card by the third party and "impersonation" by the third party.

Figure 1:
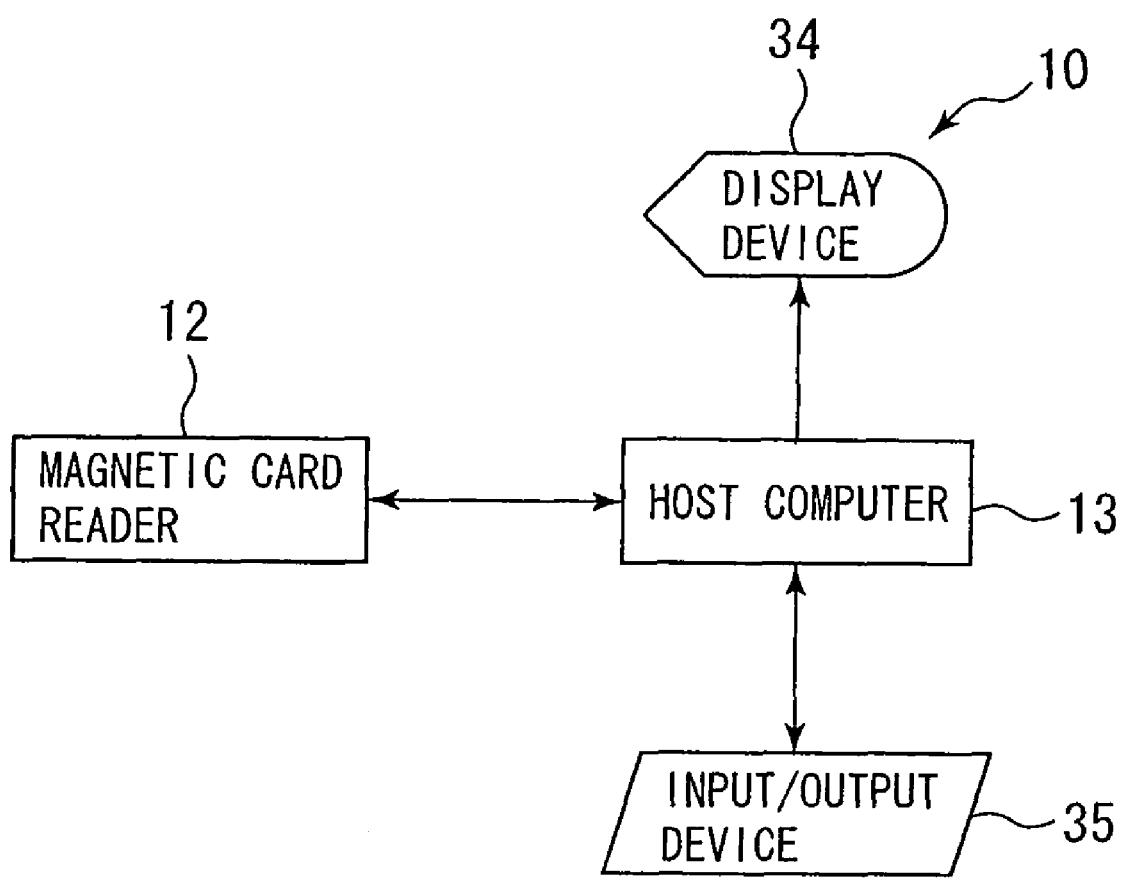
FIG. 1 is a hardware structural view showing a magnetic card reader system as an example.

EXPLANATIONS OF LETTERS OR NUMERALS 10 magnetic card reader system
11 magnetic card
12 magnetic card reader
13 host computer
23 housing
24 core
25 A/D conversion chip
26 microprocessor (digital IC)
28 synthetic resin (solid substance)

BEST MODE(S) FOR CARRYING OUT THE INVENTION

Figure 2:
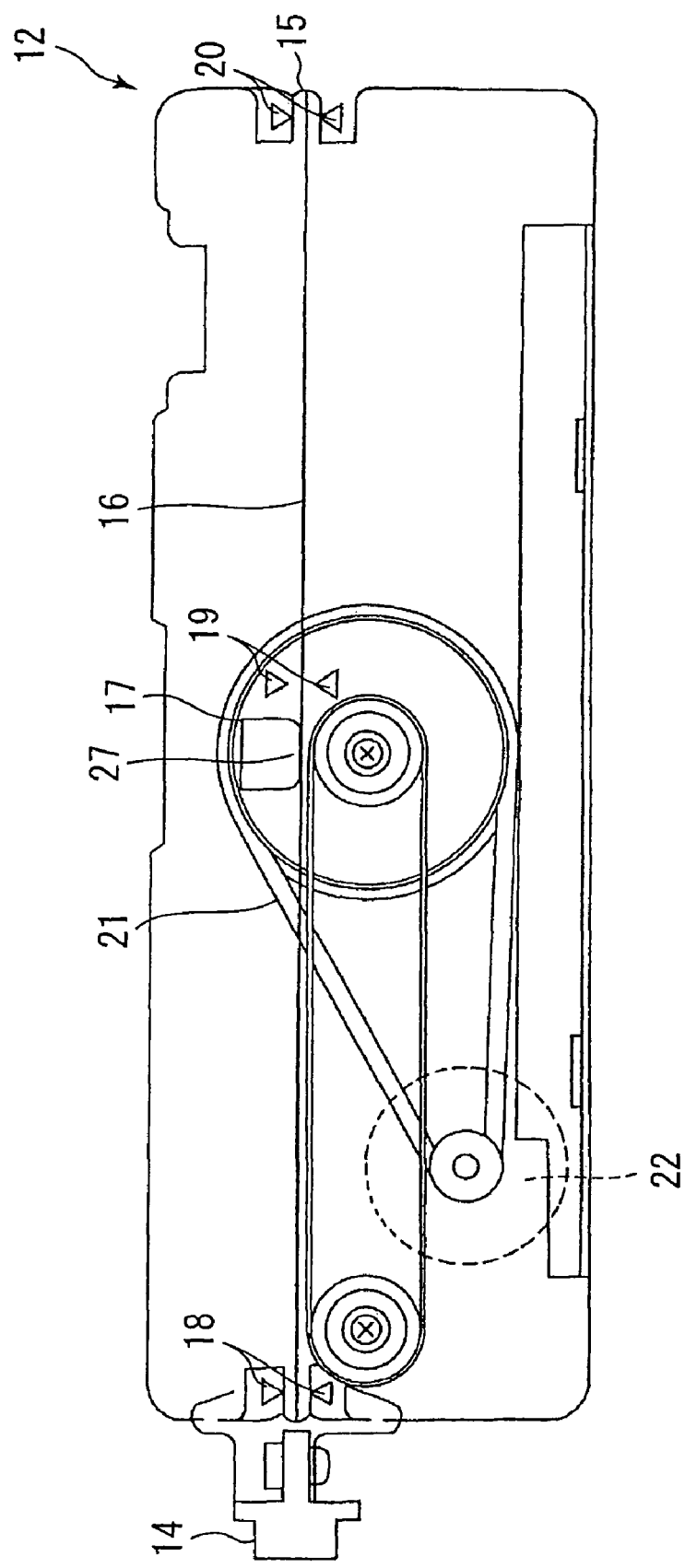
FIG. 2 is a schematic view showing an internal structure of a magnetic card reader as an example.
Figure 3:
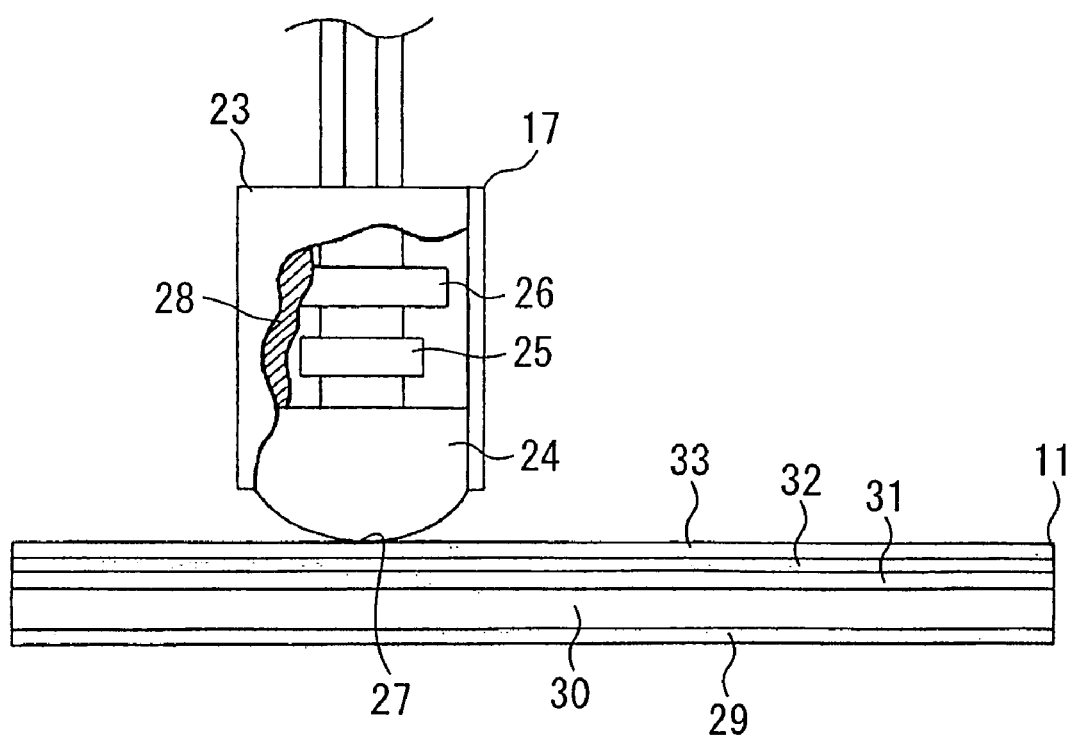
FIG. 3 is a partially cutaway perspective view of a magnetic hard.
Figure 4:
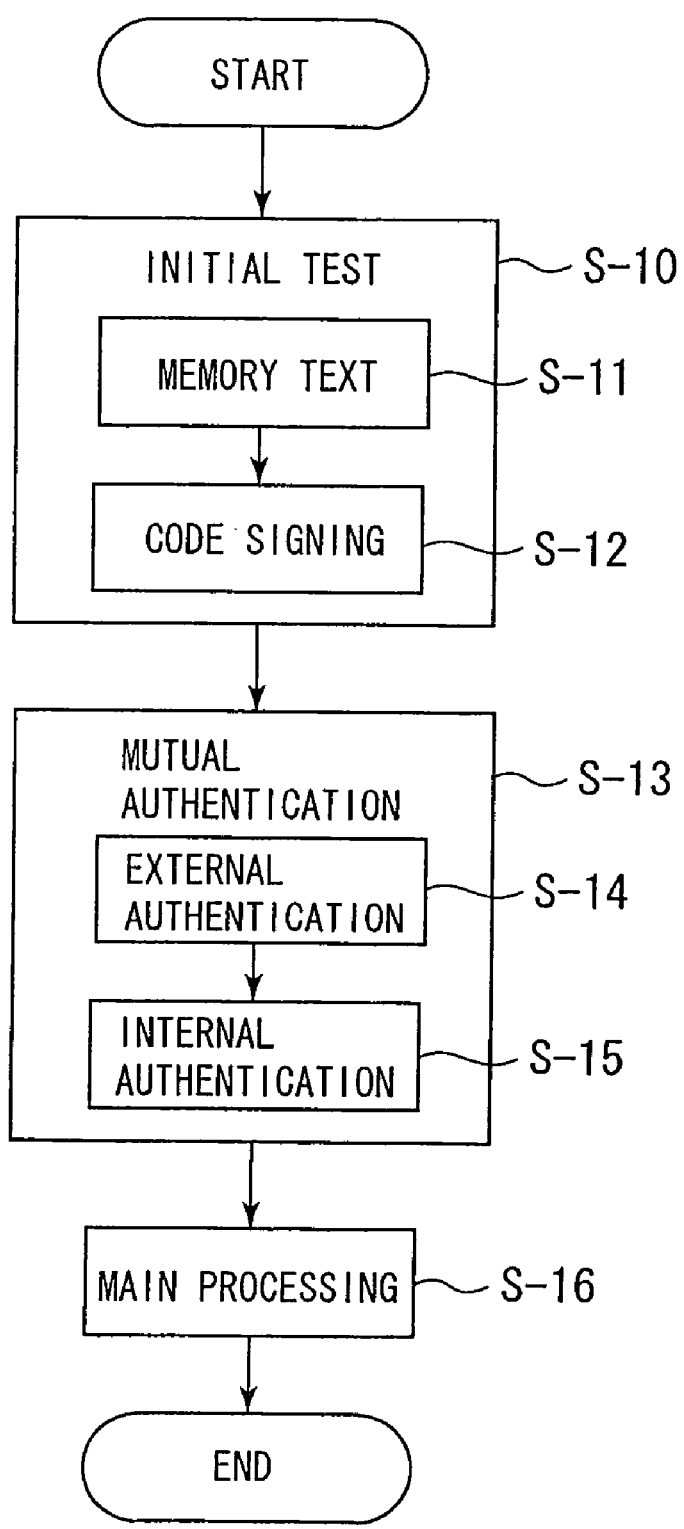
FIG. 4 is a block diagram showing an example of processing executed by the system.

A detailed explanation of a magnetic card reader system according to the present invention given with reference to accompanying drawings is as follows. FIGS. 1 and 2 are a hardware structural view showing a magnetic card reader system 100 as an example and a schematic view showing an internal structure of a magnetic card reader 12 as an example. FIGS. 3 and 4 are partially cutaway perspective view of a magnetic head 17 with a partially cutaway housing 23 and a block diagram showing an example of processing executed by this system 10. In FIG. 3, a distal end portion 27 of a core 24 is in contact with a surface of a magnetic card 11, and a synthetic resin 28 (a solid substance) filling the housing 23 is partially omitted in the drawing. The magnetic card reader system 10 is formed of the magnetic card reader 12 that converts card data stored in a magnetic layer 31 in the magnetic card 11 into electric signals and a host computer 13. The card reader 12 and the computer 13 are coupled with each other through an interface (a cable or wireless). The card data includes a card number, a code number, a user ID, a password, personal information of a card holder, business transaction contents, and others.

The magnetic hard reader 12 is of an insertion electrically driven type and has a built-in controller (not shown). The card reader 12 has a card insertion opening 14 formed at a front end, a card ejection opening 15 formed at a rear end, and a card guide rail 16 leading to the card ejection opening 15 from the card insertion opening 14. A later-explained magnetic head 17 is disposed at the center of the card reader 12. Optical sensors 18, 19, and 20 that detect a position of the magnetic card 11 moving on the guide rail 16 are disposed near the insertion opening 14, the ejection opening 15, and the magnetic heard 17. When the magnetic card 11 is inserted from the insertion opening 14, the card 11 automatically moves on the guide rail 16 to be ejected from the ejection opening 15. The card 11 is moved on the guide rail 16 by a belt 21 disposed in the card reader 12. The belt 21 is driven by a motor 22 installed in the card reader 12. The magnetic head 17, the respective sensors 18, 19, and 20, and the motor 22 are connected with the controller of the card reader 12. The controller is connected with the computer 13, drives or stops the motor 22 in response to ON/OFF of a switch, and outputs a card data reading start command or a card data reading stop command to the magnetic heard 17.

As shown in FIG. 3, the magnetic head 17 is formed of a housing 23 that covers an outer peripheral surface thereof, a core 24 to which a coil (not shown) that converts card data stored in the magnetic card 11 into analog signals is disposed, an A/D conversion chip 25 that converts analog signals into digital signals, and a microprocessor 26 (a digital IC). In the magnetic head 17 disposed in the card reader 12, a distal end portion 27 of the core 24 forming the magnetic head 17 faces the guide rail 16. Although not shown, the microprocessor 26 has a central processing unit and a storage unit (a flash memory or an EEPROM). The A/D conversion chip 24 is connected with the core 25, and the microprocessor 26 is connected with the A/D conversion chip 24 and the computer 13. The central processing unit of the microprocessor 26 activates a program stored in the storage unit based on control by an operating system, and executes later-explained mutual authenticating means, encrypting means, and transmitting means in accordance with the program. It is to be noted that a digital IC of one of a gate array, a field programmable gate array, and dedicated hardware may be disposed to the magnetic head 17 in place of the microprocessor 26.

The core 24, the A/D conversion chip 25, and the microprocessor 26 are accommodated in the housing 23. It is to be noted that the distal end portion 27 of the core 24 is exposed to the outside from a lower end of the housing 23. The A/D conversion chip 25 and the microprocessor 26 are entirely fixed in the housing 23 by using a synthetic resin 28 (a solid substance) filling the housing 23. As the synthetic resin 28, using a thermosetting synthetic resin is preferable, but a thermoplastic synthetic resin can be also used besides the thermosetting synthetic resin. Furthermore, an inorganic compound such as ceramics (a solid substance) having high resistance against a chemical solvent can be used besides an organic compound, e.g., the synthetic resin 28. In the magnetic card 11, a color printing layer 29, a base layer 30, a magnetic layer 31, a shield layer 32, a print layer 33 are aligned from a lower surface of the card in the mentioned order. The magnetic layer 31 is formed of a ferromagnetic substance, and the base layer 30 is made of polyethylene terephthalate.

Although not shown, the host computer 13 has a central processor and a storage device, and also has a built-in high-capacity hard disk. As the computer 13, a desktop type, a notebook type, or a tower type is used. To the computer 13 are connected a display (a display device 34) that displays various kinds of data, a keyboard (an input device 35) and a mouse (the input device 35) that add or change data, and a printer (an output device 35) that outputs data as printed information through interfaces (cables or wireless). The central processor of the computer 13 activates a program stored in a command file of the storage device based on control by the operating system, and executes later-explained mutual authenticating means, decrypting means, outputting means, and storing means in accordance with the program. It is to be noted that electric power is supplied to the card reader 12, the computer 13, the display device 34, and the input/output device 35 through a wiring line.

When this system 10 is activated, the central processor of the computer 13 and the central processing unit of the microprocessor 26 execute an initial test (S-10). In the initial test, a memory test (S-11) and code signing (S12) are performed. In the code signing, whether an object code of firmware has been rewritten is judged. When the initial test is terminated and its result is appropriate, the central processor of the computer 13 and the central processing unit of the microprocessor 26 execute mutual authentication for judging their validity (mutual authenticating means) (S-13). In the mutual authentication, the computer 13 executes external authentication for authenticating validity of the magnetic head 17, and then the magnetic head 17 performs internal authentication for authenticating validity of the computer 13 (S-15).

When the central processor of the computer 13 and the central processing unit of the microprocessor 26 determine that their authentication results based on the mutual authentication are valid, reading data in the magnetic card 11 by the magnetic card reader 12 is enabled, and main processing (S-16) is executed between the computer 13 and the microprocessor 26. Contrary, when at least one of the computer 13 and the microprocessor 26 determines that the authentication result is invalid, reading data in the magnetic card 11 by the card reader 12 cannot be performed, and reading disabled information is displayed in the display 34 of the computer 13. The mutual authentication is executed every time the system 10 is activated, or it is performed daily, weekly, or monthly when the system 10 is continuously operated, or it is also carried out when the central processor of the computer 13 is not synchronized with the central processing unit of the microprocessor 26 as will be explained later.

Figure 5:
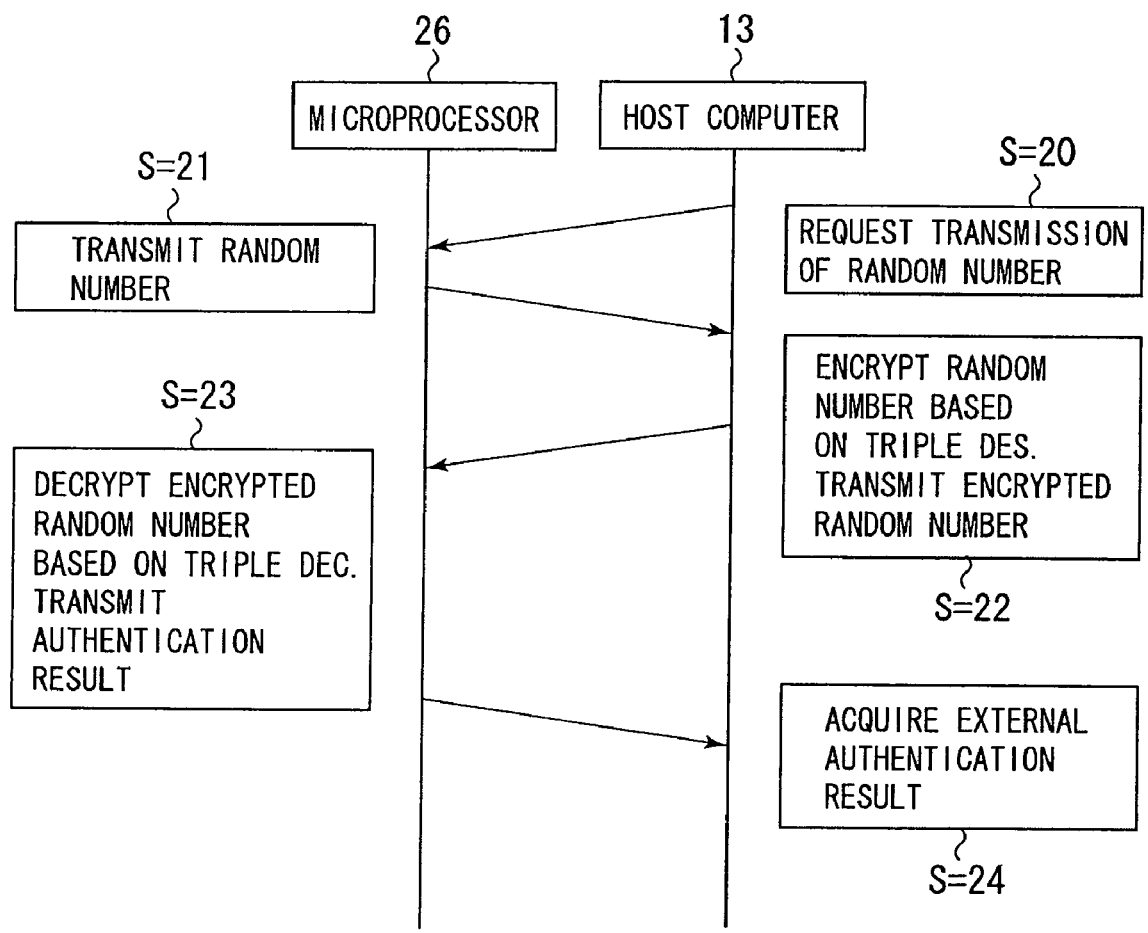
FIG. 5 is a ladder diagram showing an example of external authentication.
Figure 6:
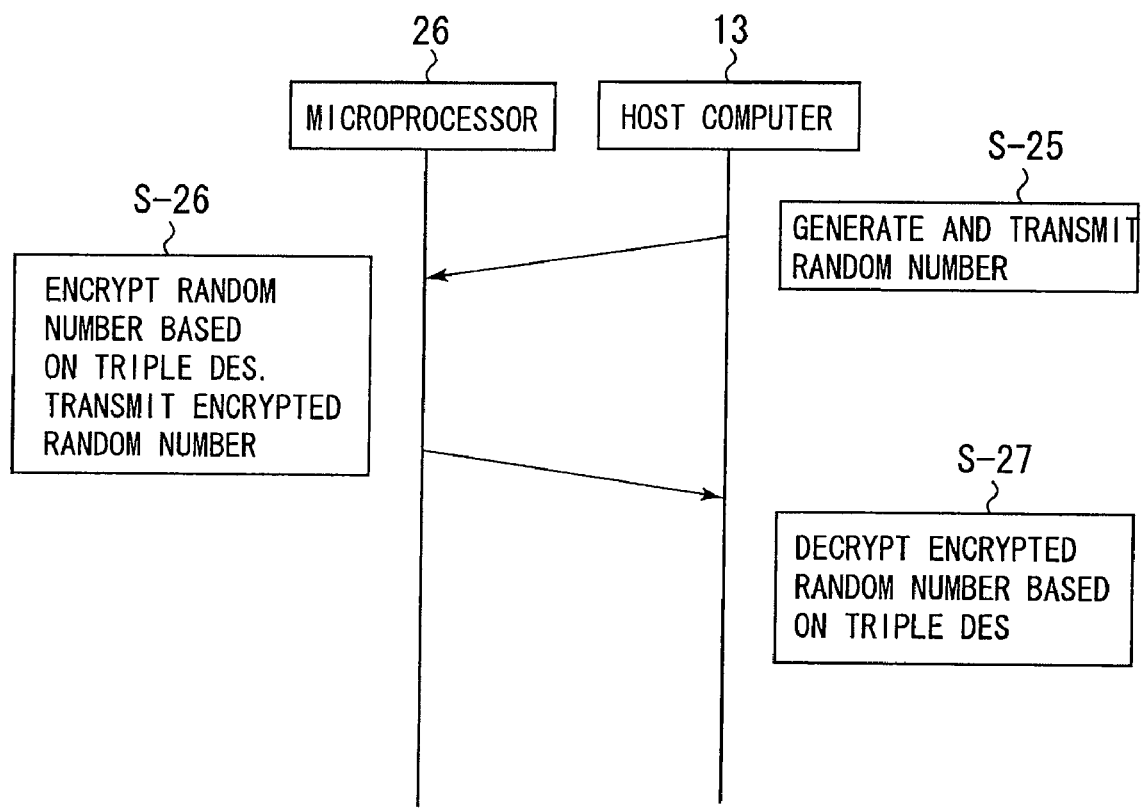
FIG. 6 is a ladder diagram showing an example of internal authentication.

FIG. 5 is a ladder diagram showing an example of the external authentication, and FIG. 6 is a ladder diagram showing an example of the internal authentication. An authentication procedure in the external authentication is as follows. The central processor of the host computer 13 requests the central processing unit of the microprocessor 26 to generate and transmit a random number (an authenticator) (S-20). The central processing unit of the microprocessor 26 generates a 64-bit random number in accordance with the command from the computer 13, and transmits it to the central processor of the computer 13 (S-21). The central processor of the computer 13 that has acquired the 64-bit random number uses an authentication key stored in the storage device to encrypt the random number based on a triple DES (Triple Data Encryption Standard), and then transmits the encrypted random number to the central processing unit of the microprocessor 26 (S-22). The central processing unit of the microprocessor 26 uses an authentication key stored in the storage unit to decrypt the random number encrypted based on the triple DES (S-23). The central processing unit of the microprocessor 26 compares its generated random number with the decrypted random number, determines that an authentication result is valid when both the keys match with each other, and transmits authentication result validity data to the central processor of the computer 13. On the other hand, when the generated random number is different from the decrypted random number, the central processing unit determines that the authentication result is invalid, and transmits authentication result invalidity data and magnetic card reading disabled data to the central processor of the computer 13. The computer 13 acquires an eternal authentication result from the microprocessor 26 (S-24).

According to the triple DES, a single DES (Single Data Encryption Standard) is repeated for three times to reduce extension of a key or deviation of an algorithm, thereby increasing encryption strength. As the triple DES, there are a three-Key tripe DES in which three keys are all different from each other and a two-Key triple DES using the same key in first and third times. As the triple DES executed in the system 10, either the three-Key triple DES or the two-Key triple DES can be used. Further, the DES executed in this system 10 may be a single DES rather than the triple DES.

An authentication procedure in the internal authentication is as follows. The central processor of the computer 13 generates a 64-bit random number (an authenticator), and transmits it to the central processing unit of the microprocessor 26 (S-25). The central processing unit of the microprocessor 26 that has acquired the 64-bit random number uses an authentication key stored in the storage unit to encrypt the random number based on the triple DES, and then transmits the encrypted random number to the central processor of the computer 13 (S-26). The central processor of the computer 13 uses an authentication key stored in the storage device to decrypt the random number encrypted based on the triple DES (S-27). The central processor compares its generated random number with the decrypted random number, and determines that an authentication result is valid when both the random numbers are equal to each other. On the other hand, when the generated random number is different from the decrypted random number, the central processor determines that the authentication result is invalid and disables reading data from the magnetic card 11 by the card reader 12.

Figure 7:
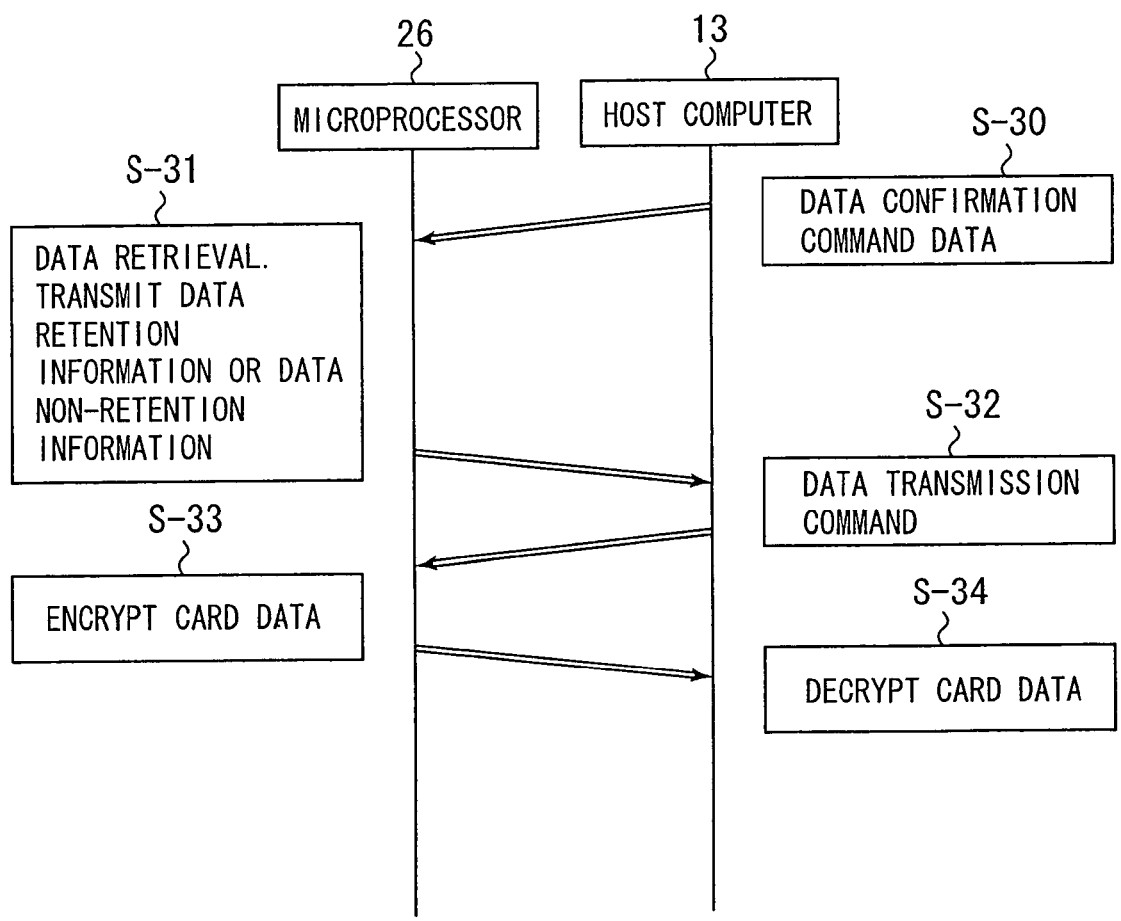
FIG. 7 is a ladder diagram showing an example of main processing in the system.

FIG. 7 is a ladder diagram showing an example of main processing in this system 10. FIGS. 8 to 13 are views for explaining generation of keys used for encryption and decryption. After the mutual authentication result is valid and reading data from the magnetic card 11 is enabled, when a card holder inserts the magnetic card 11 from the card insertion opening 14, the motor 22 is driven and the card 11 is moved on the guide rail 16. When the card 11 passes through the insertion opening 14, the optical sensor 18 detects this passage, and a card insertion signal is output from the optical sensor 18 to be input to the controller. Upon receiving the card insertion signal, the controller of the card reader 12 outputs a reading start command for card data stored in the card 11 to the microprocessor 26 of the magnetic head 17. When the magnetic card 11 passes through the magnetic head 17 and is ejected from the ejection opening 15, the optical sensors 19 and 20 detect this ejection, and a card passage signal is output from the optical sensors 19 and 20 to be input to the controller. Upon receiving the card passage signal, the controller of the card reader 12 outputs a reading stop command for card data to the microprocessor 26 of the magnetic head 17 and stops driving of the motor 22.

When the magnetized magnetic layer 31 in the magnetic card 11 passes through the distal end portion 27 of the core 24 (a gap of the core 24) in the magnetic head 17, a magnetic flux is generated in the core 24, an electromotive force is produced in a direction crossing the magnetic flux, and a current flows through the coil. A value of the current flowing through the coil varies with a change in magnetic flux. Card data stored in the magnetic layer 31 in the magnetic card 11 is fetched by the coil as an analog signal to be input to the A/D conversion chip 25 connected with the coil. The A/D conversion chip 25 converts the analog signal input from the coil into a digital signal. The digital signal is input to the microprocessor 26 from the A/D conversion chip 25 and stored in the storage unit of the microprocessor 26.

During an operation of the system 10, the central processor of the host computer 13 asks the microprocessor 26 whether card data that should be processed is present in the storage unit of the microprocessor 26 at predetermined intervals (a data conformation command). The central processor uses an information transmission/reception key stored in the storage device to encrypt the data confirmation command based on the triple DES, and transmits the encrypted data confirmation command to the microprocessor 26 (S-30). It is to be noted that the predetermined interval is preferably a unit of seconds or a unit of milliseconds. Upon receiving the data confirmation command, the central processing unit of the microprocessor 26 uses an information transmission/reception key stored in the storage unit to decrypt the data confirmation command encrypted based on the triple DES. The central processing unit of the microprocessor 26 searches the storage unit in accordance with the data confirmation command from the computer 13, transmits information indicative of retention of data to the computer 13 (data retention information) when the card data in the magnetic card 11 is stored in the storage unit as digital signals, and transmits information indicative of non-retention of data to the computer 13 (data non-retention information) when the card data is not stored in the storage unit. The microprocessor 26 uses the information transmission/reception key to encrypt the data retention information or the data non-retention information based on the triple DES, and transmits the encrypted data retention information or data non-retention information to the computer 13 (S-31).

Upon receiving the data retention information or the data non-retention information, the central processor of the computer 13 uses the information transmission/reception key to decrypt the data retention information or the data non-retention information based on the triple DES. Upon receiving the data non-retention information, the central processor again transmits the encrypted data confirmation command to the microprocessor 26 at predetermined intervals, and asks the microprocessor 26 whether card data that should be processing is present in the storage unit (the data confirmation command). Upon receiving the data retention information, the central processor requests the microprocessor 26 to transmit card data stored in the storage unit of the microprocessor 26 (a data transmission command). The central processor uses the information transmission/reception key to encrypt the data transmission command based on the triple DES, and transmits the encrypted data transmission command to the microprocessor (S-32). When the central processing unit of the microprocessor 26 receives the data transmission command, it uses the information transmission/reception key to decrypt the data transmission command encrypted based on the triple DES.

The central processing unit of the microprocessor 26 takes out a digital signal (the card data) and an encryption key from the storage unit, and uses this key to encrypt the digital signal, thereby providing encrypted data (encrypting means) (S-33). The central processing unit transmits the encrypted data to the host computer 13 (transmitting means). The host computer 13 has an amplification circuit (not shown) that amplifies encrypted data, takes out decryption key from the storage device, and uses this key to decrypt the encrypted data amplified by the amplification circuit (decrypting means) (S-34). The computer 13 can display the decrypted digital signal (plain text card data) as textual information in the display 34 (outputting means) and allow the printer 35 to print the decrypted digital signal (the plain text card data) as printed information (the outputting means). The computer 13 stores the encrypted digital signal or the decrypted digital signal in the storage device (storing means). When the encrypted data is decrypted, the computer 13 again transmits an encrypted data confirmation command to the microprocessor 26 at predetermined intervals and asks the microprocessor 26 whether card data that should be processed is present in the storage unit (the data confirmation command).

The central processor of the computer 13 and the central processing unit of the microprocessor 26 sequentially generate the same new second to nth keys required for encryption and decryption of digital signals while being synchronized with each other by using the same finite regressive counter value previously stored in the storage device and the storage unit every time an encrypted digital signal is input to the computer 13 (key generating means). An example of a key generation procedure executed by the central processor of the computer 13 and the central processing unit of the microprocessor 26 will now be explained hereinafter with reference to FIGS. 8 to 13. It is to be noted that the regenerative counter value is 1 to 20. However, the regressive counter value is not restricted in particular, and the counter value may be 21 or above.

Figure 8:
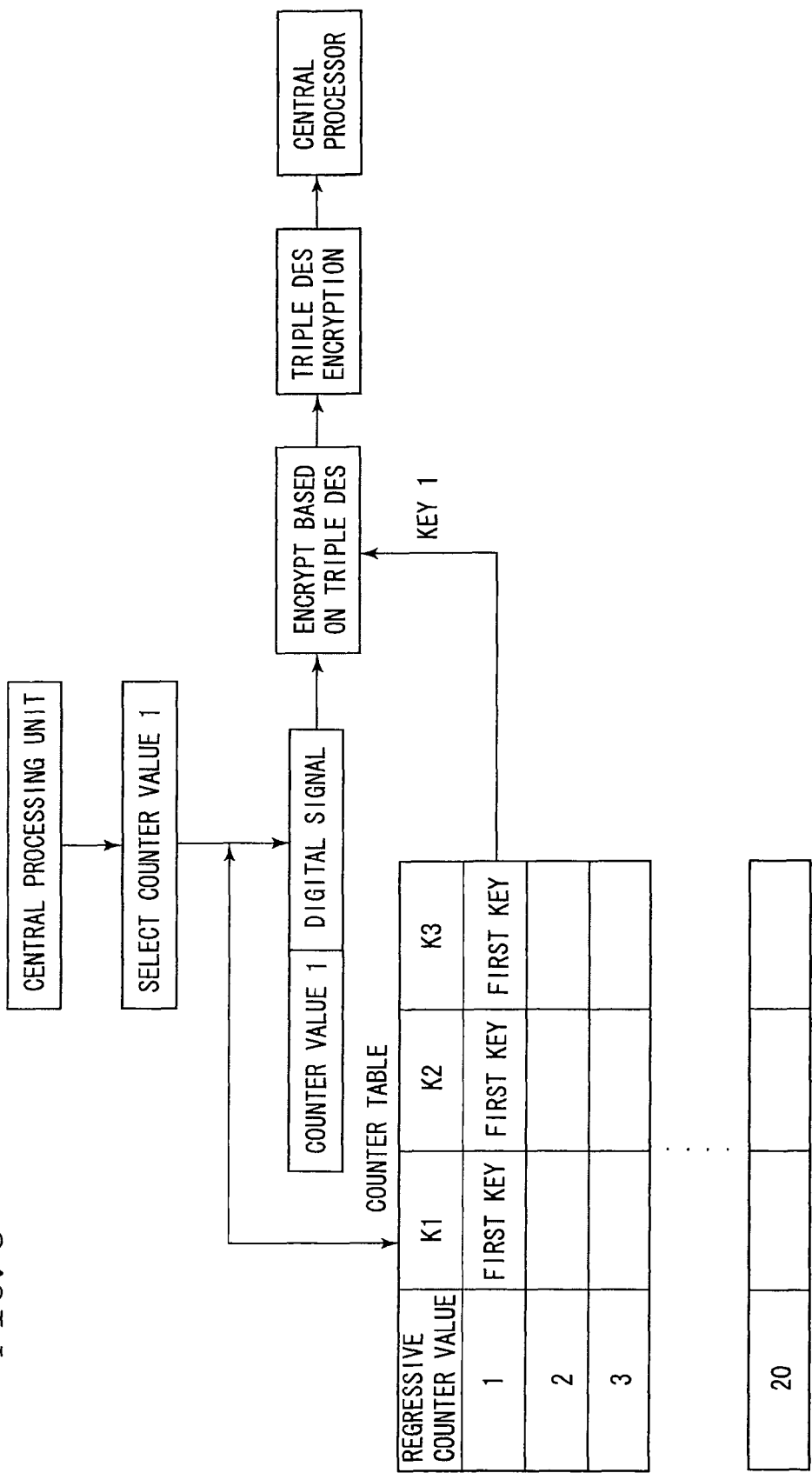
FIG. 8 is a view for explaining generation of keys used for encryption and decryption.

After activating the system 10, when a data transmission command is received after a first digital signal (card data) is input to the microprocessor 26 from the A/D conversion chip 25 and the digital signal is stored in the storage unit, the central processing unit of the microprocessor 26 selects a regressive counter value 1 from a counter table stored in the storage unit and adds the counter value 1 to the digital signal as shown in FIG. 8. A storage area for counter values (1 to 20) and three key storage areas (K1, K2, and K3) associated with this area are formed in the counter table. However, in the counter table shown in FIG. 8, second to 20th keys corresponding to the regressive counter values 2 to 20 are not generated. It is to be noted that a first key (Key 1) corresponding to the counter value 1 is set as an initial value at the time of introduction of the system 10. The central processing unit takes out the first key corresponding to the counter value 1 from the counter table, uses the first key to encrypt the digital signal and the counter value 1 based on triple DES (a three-Key triple DES) and thereby provide encrypted data (encrypting means), and transmits the encrypted data to the central processor of the computer 13 (transmitting means). After transmitting the encrypted data to the computer 13, the central processing unit changes the regressive counter value from 1 to 2, stores the counter value 2 in the storage unit, and erases the first digital signal (the card data) from the storage unit.

Figure 9:
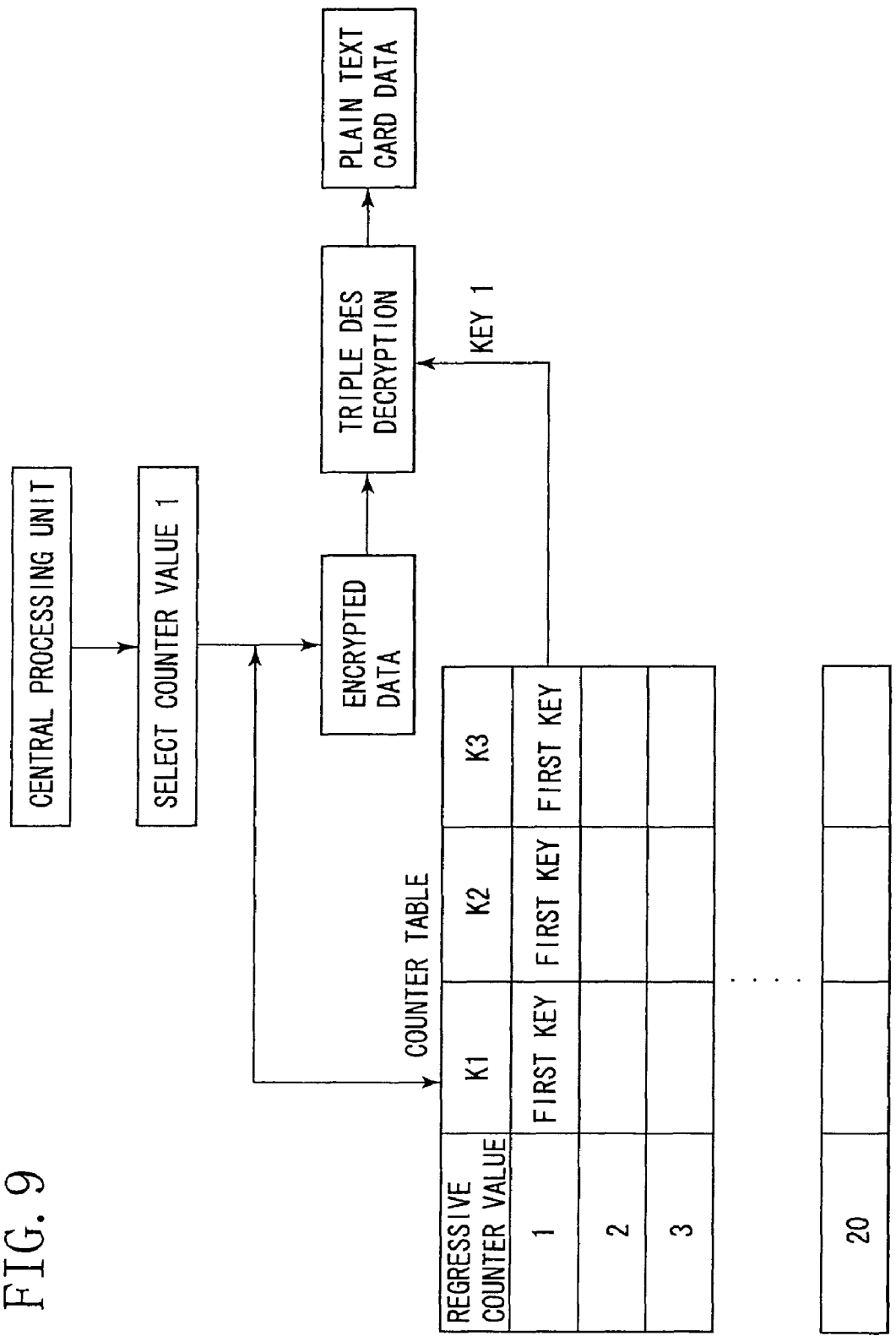
FIG. 9 is a view for explaining generation of keys used for encryption and decryption.

The central processor of the computer 13 that has received the first encrypted data selects a regressive counter value 1 from a counter table stored in the storage device as shown in FIG. 9. In the counter table, a storage area for counter values (1 to 20) and three key storage areas (K1, K2, and K3) associated with this storage area are formed. However, in the counter table shown in FIG. 9, second to 20th keys corresponding to the regressive counter values 2 to 20 are not generated. It is to be noted that the first key (Key 1) corresponding to the counter value 1 is the same as the first key stored in the storage unit of the microprocessor 26, and it is set as an initial value at the time of introduction of the system 10. The central processor takes out the first key corresponding to the counter value 1 from the counter table, and uses the first key to decrypt the encrypted data based on the triple DES (three-Key triple DES), thereby obtaining a digital signal (plain text card data). After decrypting the encrypted data, the central processor changes the regressive counter value from 1 to 2 and stores the counter value 2 in the storage device.

Figure 10:
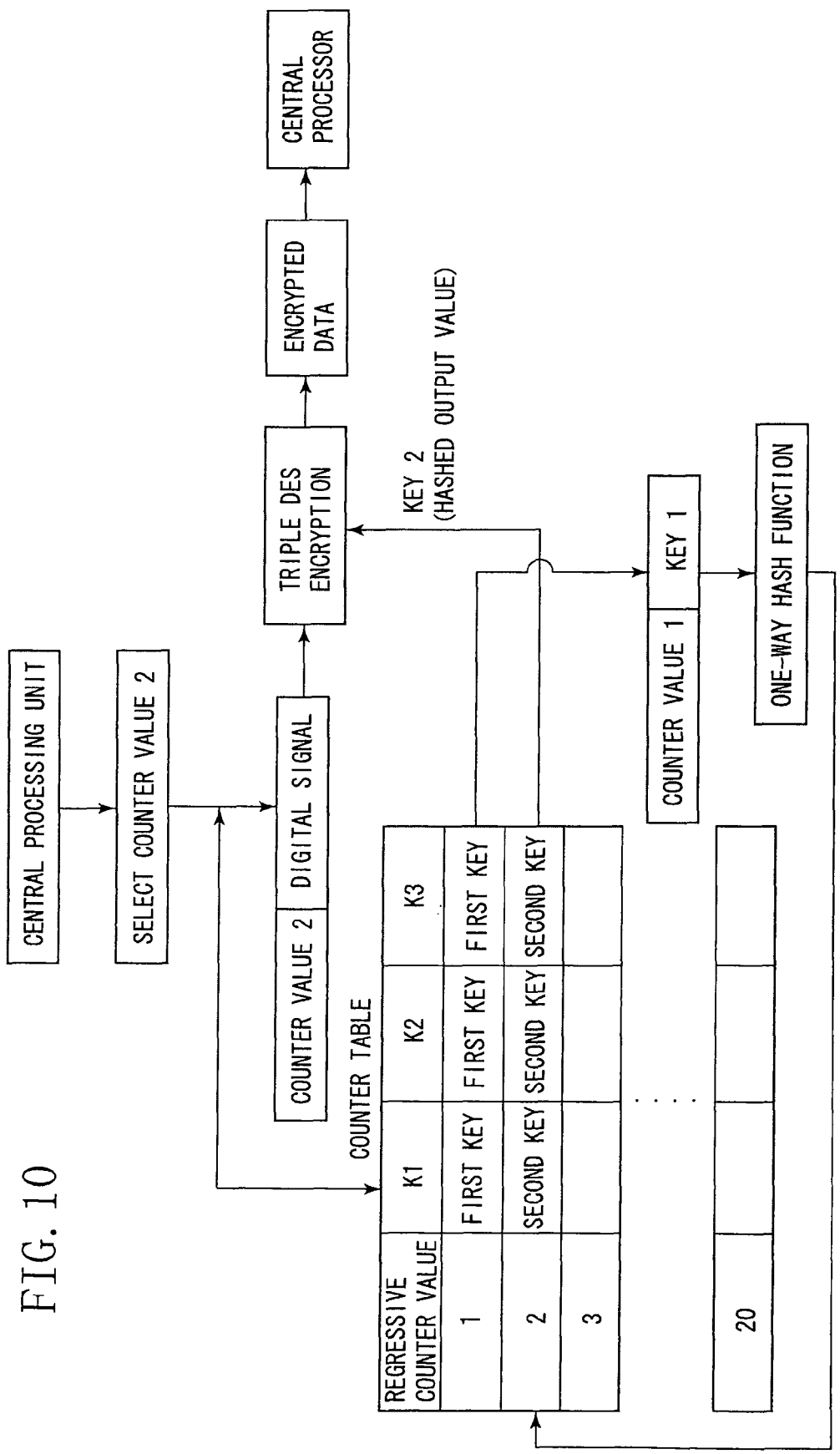
FIG. 10 is a view for explaining generation of keys used for encryption and decryption.

When a data transmission command is received after a second digital signal (card data) is input to the microprocessor 26 from the A/D conversion chip 25 and the digital signal is stored in the storage unit, the central processing unit of the microprocessor 26 selects the regressive counter value 2 from the counter table stored in the storage unit and adds the counter value 2 to the digital signal as shown in FIG. 10. The central processing unit generates a hashed output value obtained by hashing the first key (the initial value) corresponding to the counter value 1 and the counter value 1 by using a one-way hash function, and determines this hashed output value as a second key (Key 2) corresponding to the counter value 2 (the key generating means). The hashed output value as the second key (Key 2) is written in the key storage areas (K1, K2, and K3) corresponding to the counter value 2 in the counter table. It is to be noted that third to 20th keys corresponding to the regressive counter values 3 to 20 are not generated in the counter table depicted in FIG. 10. The central processing unit takes out the second key corresponding to the counter value 2 from the counter table, uses the second key to encrypt the digital signal (including the counter value 2) based on the triple DES (the three-Key triple DES) and thereby provide encrypted data (the encrypting means), and transmits the encrypted data to the central processor of the computer 13. After transmitting the encrypted data to the computer 13, the central processing unit changes the regressive counter value from 2 to 3, stores the counter value 3 in the storage unit, and erases the second digital signal (the card data) from the storage unit.

Figure 11:
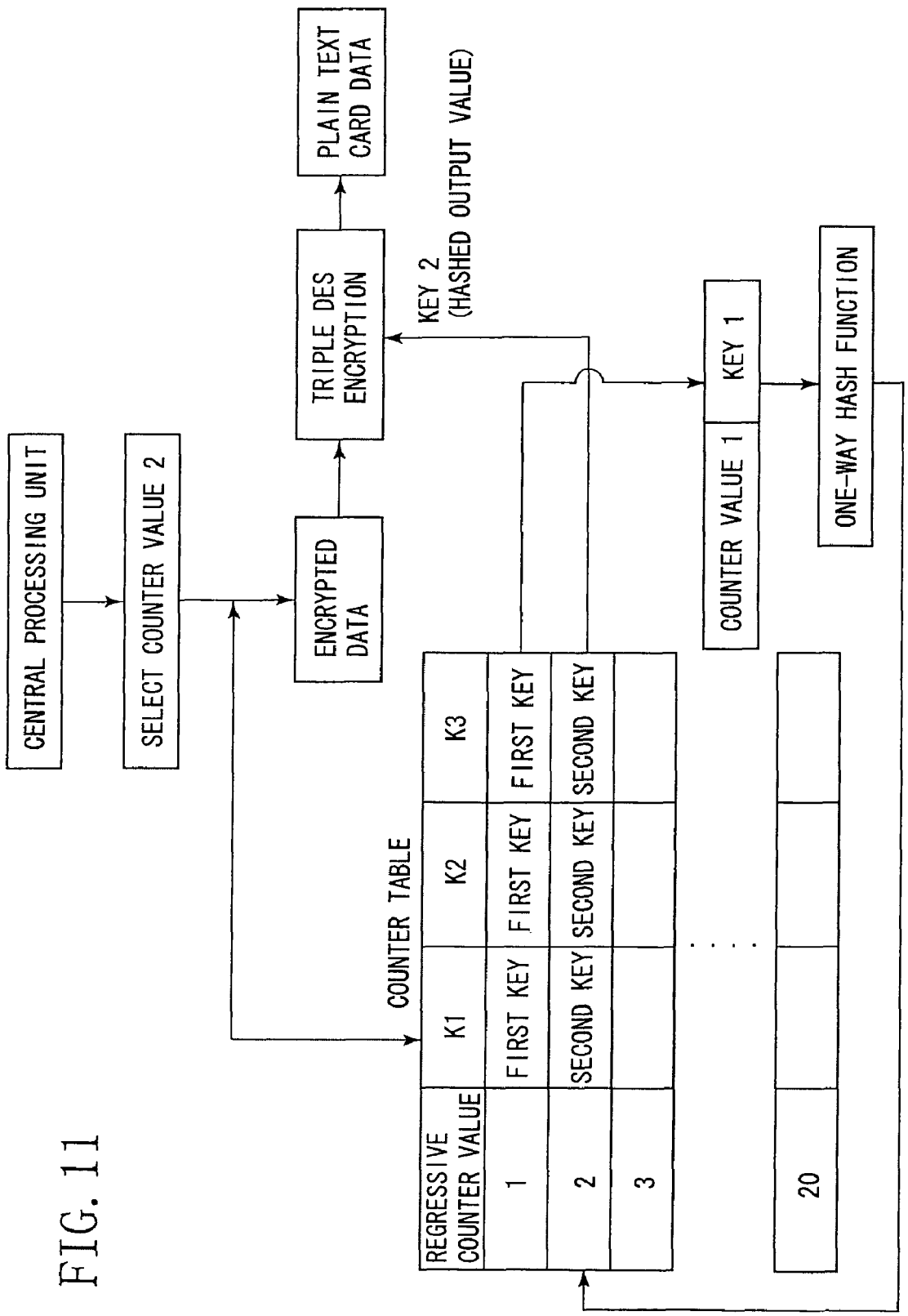
FIG. 11 is a view for explaining generation of keys used for encryption and decryption.

As shown in FIG. 11, the central processor of the computer 13 that has received the second encrypted data selects the regressive counter value 2 from the counter table stored in the storage device. The central processor generates a hashed output value obtained by hashing the first key (the initial value) corresponding to the counter value 1 and the counter value 1 by using a one-way hash function, and determines this hashed output value as a second key (Key 2) corresponding to the counter value 2 (the key generating means). The hash function used by the central processor is the same as that utilized by the central processing unit of the microprocessor 26, and the generated second key (Key 2) is the same as that produced by the central processing unit of the microprocessor 26. The hash output value serving as the second key (Key 2) is written in the key storage areas (K1, K2, and K3) corresponding to the counter value 2 in the counter table. It is to be noted that third to 20th keys corresponding to the regressive counter values 3 to 20 are note generated in the counter table depicted in FIG. 11. The central processor takes out the second key corresponding to the counter value 2 from the counter table, and uses the second key to decrypt the encrypted data based on the triple DES (the three-Key triple DES), thereby obtaining a digital signal (plain text card data). After decrypting the encrypted data, the central processor changes the regressive counter value from 2 to 3, and stores the counter value 3 in the storage device.

Figure 12:
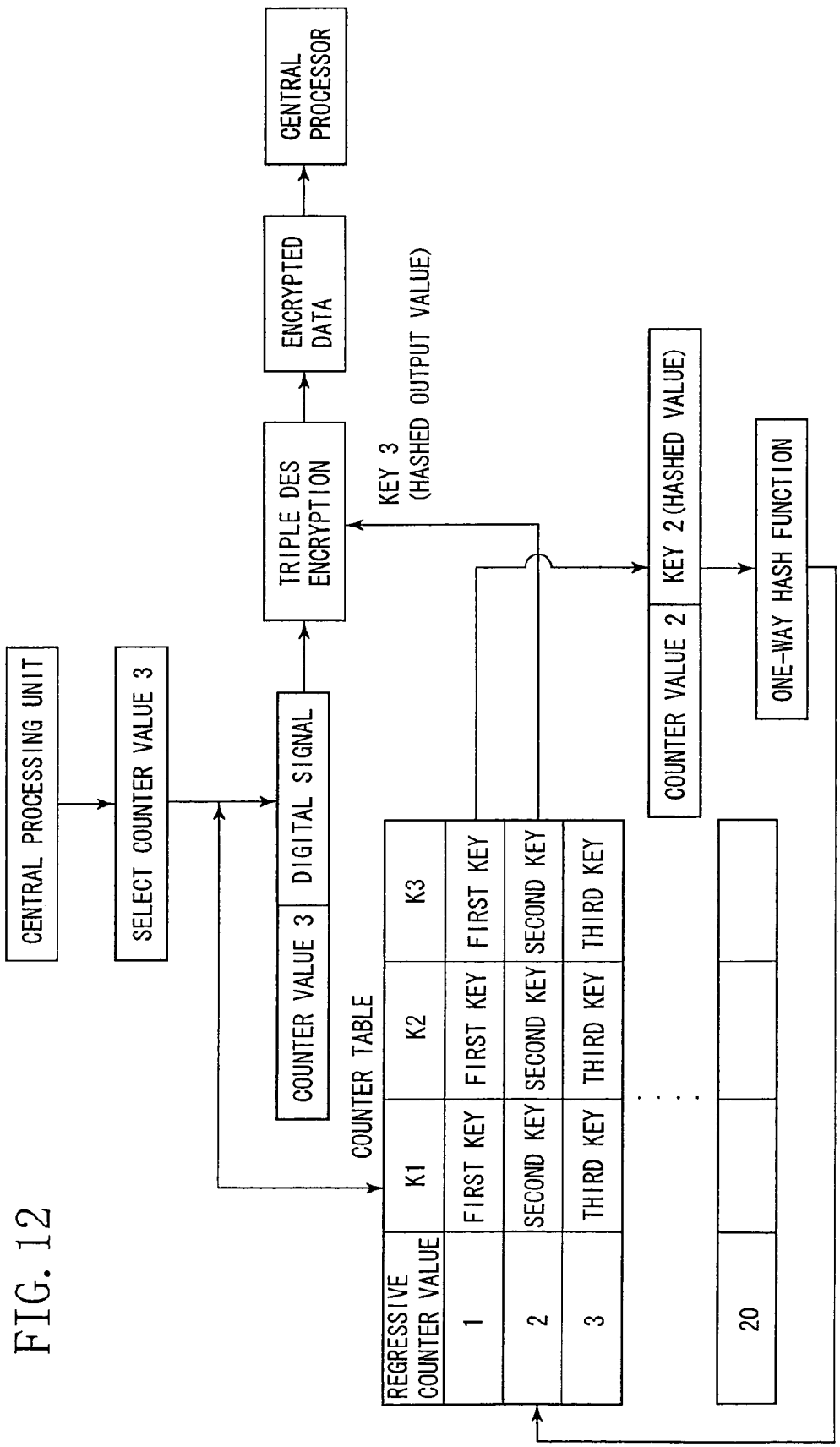
FIG. 12 is a view for explaining generation of keys used for encryption and decryption.

When a data transmission command is received after a third digital signal (card data) is input to the microprocessor 26 from the A/D conversion chip 25 and the digital signal is stored in the storage unit, the central processing unit of the microprocessor 26 selects the regressive counter value 3 from the counter table stored in the storage unit and adds the counter value 3 to the digital signal as shown in FIG. 12. The central processing unit generates a hashed output value obtained by hashing the second key (Key 2, a hashed value) corresponding to the counter value 2 and the counter value 2 by using the one-way hash function, and determines this hashed output value as a third key (Key 3) corresponding to the counter value 3 (the key generating means). The hashed output value serving as the third key (Key 3) is written in the key storage areas (K1, K2, and K3) corresponding to the counter value 3 in the counter table. It is to be noted that fourth to 20th keys corresponding to the regressive counter values 4 to 20 are not generated in the counter table depicted in FIG. 12. The central processing unit takes out the third key corresponding to the counter value 3 from the counter table, uses the third key to encrypt the digital signal (including the counter value 3) based on the triple DES (the three-Key triple DES) and thereby provide encrypted data (the encrypting means), and transmits the encrypted data to the central processor of the computer 13. After transmitting the encrypted data to the computer 13, the central processing unit changes the regressive counter value from 3 to 4, stores the counter value 4 in the storage unit, and erases the third digital signal (the card data) from the storage unit.

Figure 13:
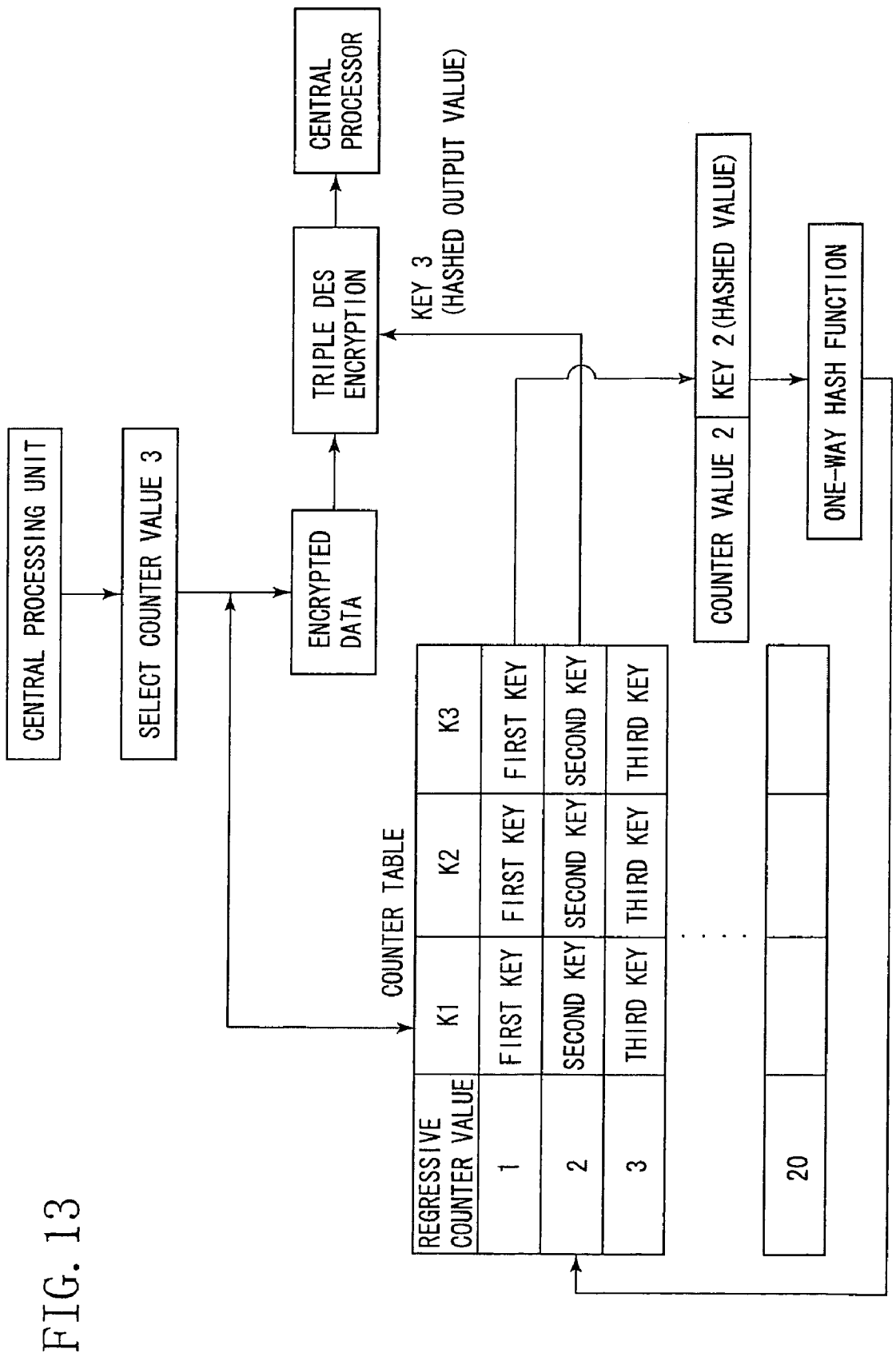
FIG. 13 is a view for explaining generation of keys used for encryption and decryption.

As shown in FIG. 13, the central processor of the computer 13 that has received the third encrypted data selects the regressive counter value 3 from the counter table stored in the storage device. The central processor generates a hashed output value obtained by hashing the second key (Key 2) corresponding to the counter value 2 and the counter value 2 by using the one-way hash function, and determines this hashed output value as a third key (Key 3) corresponding to the counter value 3 (the key generating means). The third key (Key 3) generated by the central processor is the same as that produced by the central processing unit of the microprocessor 26. The hashed output value serving as the third key (Key 3) is written in the key storage areas (K1, K2, and K3) corresponding to the counter value 3 in the counter table. It is to be noted that fourth to 20th keys corresponding to the regressive counter values 4 to 20 are not generated in the counter table depicted in FIG. 13. The central processor takes out the third key corresponding to the counter value 3 from the counter table, and uses the third key to decrypt the encrypted data based on the triple DES (the three-key triple DES), thereby obtaining a digital signal (plain text card data). After decrypting the encrypted data, the central processor changes the regressive counter value 3 to 4 and stores the counter value 4 in the storage device.

In this manner, the central processor of the computer 13 and the central processing unit of the microprocessor 26 use the one-way hash function to generate the second to nth keys while sequentially utilizing the regressive counter values 1 to 20 to be synchronized with each other. When the regressive counter value exceeds 20, the central processor and the central processing unit again use the counter value 1 to sequentially produce 21st to 40th keys. The central processor and the central processing unit rewrite the first key stored in the key storage areas with the 21st key when the 21st key is generated, and rewrite the second key stored in the key storage areas with the 22nd key when the 22nd key is produced.

In this magnetic card reader system 10, since the central processor of the computer 13 and the central processing unit of the microprocessor 26 can judge mutual validity by executing the mutual authenticating means, even if a false computer is connected with the magnetic head 17 or a false magnetic head is connected with the computer 13, this connection can be detected. In the system 10, a third party cannot access the system 10 by utilizing a false computer or a false magnetic head, and theft of card data in the magnetic card 11, the hash function, and the keys can be avoided. In the system 10, since the central processing unit executes the encrypting means and the transmitting means and the central processor executes the decrypting means after the central processor of the computer 13 and the central processing unit of the microprocessor 26 determine that an authentication result obtained by the authenticating means is valid, theft of card data stored in the magnetic card 11 can be assuredly avoided as compared with a case where these means are executed without performing authentication, thereby assuredly preventing fraudulent duplication of the magnetic card 11 by the third party or "impersonation" by the third party.

In the system 10, since the central processor of the computer 13 and the central processing unit of the microprocessor 26 individually generate the second to nth keys, the computer 13 does not have to transmit each key to the microprocessor 26, thereby preventing fraudulent acquisition of the key in the key transmission process. In this system 10, since the central processing unit of the microprocessor 26 always uses another key to perform encryption and the central processor of the computer 13 always uses another key to effect decryption, even if a third person acquires a key, card data stored in the magnetic card 11 cannot be decrypted. Further, since hashed values are used as the second to nth keys, even if the third party fraudulently obtains each key, the key cannot be decoded, thus assuredly avoiding use of the key by the third party.

In the system 10, since the central processor of the computer 13 and the central processing unit of the microprocessor 26 sequentially generate the second to nth keys while using the same finite regressive counter value to be synchronized with each other, the key generated by the computer 13 can be matched with the key produced by the microprocessor 26, and disabled decryption of encrypted data due to mismatch between the generated keys can be avoided. Furthermore, the hashed output values serving as the second to nth keys include hashed output values obtained by hashing the regressive counter values, even if a third party fraudulently accesses the system 10, he/she cannot decode the hashed regressive counter values and cannot judge which counter value is used to achieve synchronization between the central processor of the computer 13 and the central processing unit of the microprocessor 26.

When the central processor of the computer 13 and the central processing unit of the microprocessor 26 become out of synchronization during an operation of the system 10, the key generated by the central processor becomes different from the key produced by the central processing unit, and encrypted data transmitted from the central processing unit cannot be decrypted by the central processor. In this case, the central processor of the computer 13 determines that decryption using the generated key is impossible, informs that decryption is disabled (decryption disabled information), and requests resynchronization (a resynchronization request). The central processor uses the information transmission/reception key stored in the storage device to encrypt the decryption disabled information and the resynchronization request based on the triple DES, and transmits the encrypted decryption disabled information and resynchronization request to the microprocessor 26. The central processor of the computer 13 and the central processing unit of the microprocessor 26 which has received the resynchronization request again execute external authentication and internal authentication for judging their validity (see FIGS. 5 and 6). When the central processor of the computer 13 and the central processing unit of the microprocessor 26 determine that a mutual authentication result of mutual authentication is valid, they reset the regressive counter value to 1 (an initial value) to again start synchronization. When the counter value is reset to 1, the central processor and the central processing unit again use the first key to execute encryption and decryption.

In the system 10, even if the generated keys do not match with each other, the computer 13 and the microprocessor 26 can reset the regressive counter value to 1 to be again synchronized with each other, and hence the key generated by the computer 13 can be again matched with the key produced by the microprocessor 26, thereby preventing decryption of card data from being disabled due to mismatch between the generated keys. It is to be noted that, in a case where the system 10 continuously operates and mutual authentication is performed daily, weekly, or monthly, the central processor of the computer 13 and the central processing unit of the microprocessor 26 reset the regressive counter value to 1 to be again synchronized with each other when they determine that a mutual authentication result of mutual authentication is valid. The subsequent procedure is the same as that explained with reference to FIGS. 8 to 13.

As the one-way hash function, one of SHA-1 (Secure Hash Algorithm 1), MD2 MD4, MD5 (Message Digest 2, 4, 5), RIPEMD-80, RIPEMD-128, RIPEMD-160, and N-Hash is used. These hash functions are stored in the storage device of the computer 13.

The host computer 13 can stop use of the currently utilized hash function, select a new hash function from the hash functions stored in the storage device, and use the selected hash function. The hash function may be changed every time the system 10 is activated, or changed daily, weekly, or monthly, or changed when synchronization is again achieved after the central processor and the central processing unit become out of synchronization. When using the new hash function, the computer 13 instructs the microprocessor 26 to rewrite the existing hash function (a function change command). The central processor of the computer 13 uses the information transmission/reception key stored in the storage device to encrypt the function change command and the new hash function based on the triple DES, and transmits the encrypted function change command and hash function to the microprocessor 26. Upon receiving the function change command and the hash function, the central processing unit of the microprocessor 26 uses the information transmission/reception key stored in the storage unit to decrypt the function change command and the hash function encrypted based on the triple DES. The central processing unit of the microprocessor 26 decrypts the existing hash function stored in the storage unit to be replaced with the new hash function, and informs the computer 13 of completion of the change (change completion notification). The central processing unit uses the information transmission/reception key stored in the storage unit to encrypt the change completion notification based on the triple DES, and transmits the encrypted change completion notification to the computer 13. In this system 10, since the function change command or the hash function are encrypted to change the hash function, the hash function to be utilized cannot be acquired by a third party, thereby preventing the hash function from being decoded by the third party.

As the encryption algorithm, it is possible to use one of RSA, AES (Advanced Encryption Standard), IDEA (International Data Encryption Algorithm), FEAL-N/NX (Fast Encryption Algorithm), MULTI2 (Multimedia Encryption 2), MISTY, SXAL (Substitution Xor Algorithm), MBAL (Multi Block Algorithm), RC2, RC5, ENCRiP, SAFER (Secure And Fast Encryption Routine), Blowfish, Skipjack, Khufu, Khafre, CAST, and GST28147-89 besides DES. These algorithms are stored in the storage device of the computer 13.

The host computer 13 can stop use of the currently utilized encryption algorithm, select a new algorithm from the encryption algorithms stored in the storage device, and utilize the selected algorithm. The encryption algorithm may be changed every time the system 10 is activated, or changed daily, weekly, or monthly, or may be changed when synchronization is again achieved after the central processor and the central processing unit become out of synchronization. When using the new encryption algorithm, the computer 13 instructs the microprocessor 26 to rewrite the existing algorithm (a function change command). The central processor of the computer 13 uses the information transmission/reception key stored in the storage device to encrypt the function change command and the new encryption algorithm based on triple DES, and transmits the encrypted function change command and algorithm to the microprocessor 26. Upon receiving the function change command and the encryption algorithm, the central processing unit of the microprocessor 26 uses the information transmission/reception key stored in the storage unit to decrypt the function change command and the algorithm encrypted based on the triple DES. The central processing unit of the microprocessor 26 changes the existing algorithm stored in the storage unit to the decrypted new algorithm, and then informs the computer 13 of completion of the change (change completion notification). The central processing unit uses the information transmission/reception key stored in the storage unit to encrypt the change completion notification based on the triple DES, and transmits the encrypted change completion notification to the computer 13. In this system 10, since the function change command or the encryption algorithm is encrypted and then the algorithm is changed, the algorithm to be utilized cannot be acquired by a third party.

The invention claimed is:

1. A magnetic card reader system comprising: a magnetic card reader including a magnetic head that reads predetermined data from a magnetic card storing the data; and a computer connected with the card reader, characterized in that:

the magnetic head comprises a core including a coil that converts data stored in the magnetic card into an analog signal, an A/D conversion chip that is connected with the coil and converts the analog signal into a digital signal, and a digital IC that is connected with the A/D conversion chip; and the computer and the digital IC have mutual authenticating means for authenticating each other, and the digital IC executes encrypting means for encrypting the digital signal by using a key stored therein and transmitting means for transmitting the digital signal encrypted by the encrypting means to the computer and the computer executes decrypting means for decrypting the encrypted digital signal by using a key stored therein after the computer and the digital IC determine that a mutual authentication result obtained by the mutual authenticating means is valid, wherein a hashed output value obtained by hashing a predetermined initial value by using a predetermined one-way hash function is used as the second key generated by the key generating means, and a hashed output value obtained by using the one-way hash function to hash a hashed output value as a previous key hashed by the one-way function is used as each of the third to nth keys generated by the key generating means.

2. The magnetic card reader system according to claim 1, wherein the computer and the digital IC execute key generating means for sequentially generating the same new second to nth keys required for encryption and decryption of a digital signal in synchronization with each other and use the generated second to nth keys to encrypt the digital signal and decrypt the encrypted digital signal every time the digital signal encrypted by the encrypting means is input to the computer.

3. The magnetic card reader system according to claim 2, wherein the magnetic head includes a housing that covers an outer periphery thereof, and the core, the A/D conversion chip, and the digital IC are accommodated in the housing.

4. The magnetic card reader system according to claim 1, wherein the computer and the digital IC sequentially generate the second to nth keys while being synchronized with each other by using the same finite regressive counter value stored therein, and the hashed output values serving as the second to nth keys include a hashed output value obtained by hashing the regressive output value.

5. The magnetic card reader system according to claim 4, wherein, when the computer determines that decryption using the key generated by the key generating means is impossible, the computer again executes the mutual authenticating means with the digital IC, and the computer and the digital IC reset the regressive counter value to an initial value to be again synchronized with each other after determining that a mutual authentication result obtained by the mutual authenticating means is valid.

6. The magnetic card reader system according to claim 5, wherein the magnetic head includes a housing that covers an outer periphery thereof, and the core, the A/D conversion chip, and the digital IC are accommodated in the housing.

7. The magnetic card reader system according to claim 4, wherein the magnetic head includes a housing that covers an outer periphery thereof, and the core, the A/D conversion chip, and the digital IC are accommodated in the housing.

8. The magnetic card reader system according to claim 1, wherein the magnetic head includes a housing that covers an outer periphery thereof, and the core, the A/D conversion chip, and the digital IC are accommodated in the housing.

9. The magnetic card reader system according to claim 8, wherein the A/D conversion chip and the digital IC are fixed in the housing by a solid substance filling the inside of the housing.

* * * * *